United States Patent [19]

Yassemi

[11] 4,284,917
[45] Aug. 18, 1981

[54] ELECTRIC MOTOR CONSTRUCTION

[75] Inventor: Mark Yassemi, Glendale, Calif.

[73] Assignee: Excellon Industries, Torrance, Calif.

[21] Appl. No.: 25,280

[22] Filed: Mar. 29, 1979

[51] Int. Cl.³ .............................................. H02K 5/00
[52] U.S. Cl. ...................................... 310/89; 310/52; 310/90; 310/157
[58] Field of Search .................... 310/47, 50, 90, 157, 310/89, 52, 54, 58, 59, 60 R, 60 A, 42, 51, 91

[56] References Cited

U.S. PATENT DOCUMENTS

| 2,623,186 | 12/1952 | Wilde | 310/89 |
| 2,717,321 | 9/1955 | Stearns | 310/89 |
| 3,502,915 | 3/1970 | Moret | 310/47 |
| 3,525,001 | 8/1970 | Erickson | 310/59 |
| 3,581,131 | 5/1971 | Richter | 310/58 |
| 3,882,334 | 5/1975 | Newill | 310/59 |

FOREIGN PATENT DOCUMENTS

| 267668 | 1/1969 | Austria | 310/89 |
| 111556 | 6/1963 | Czechoslovakia | 310/89 |
| 2149972 | 4/1973 | Fed. Rep. of Germany | 310/89 |
| 42-30547 | 3/1967 | Japan | 310/89 |

*Primary Examiner*—R. Skudy
*Attorney, Agent, or Firm*—Gausewitz, Carr, Rothenberg & Edwards

[57] ABSTRACT

This invention provides an electric motor for high speed operation that includes an inner housing assembly made up of two members having tubular walls having telescoped sections bonded together at the central portion of the assembly, with the field of motor bonded to the inside of the two inner housing members. The opposite ends of the inner housing assembly then are bored to provide precisely aligned bearing support surfaces. Ball bearings fit on these surfaces and rotatably mount the armature. An outer housing fits around the inner housing and is spaced from it, providing an unobstructed annular passageway for circulating coolant. The passageway includes inwardly directed portions around the bearings for efficient removal of heat from those areas.

14 Claims, 6 Drawing Figures

ELECTRIC MOTOR CONSTRUCTION

FIELD OF THE INVENTION

This invention pertains to the construction of an electric motor.

BACKGROUND OF THE INVENTION

In certain machines, such as automatic drilling machines, routers or combination drillers and routers used in the printed circuit board industry, it is common practice to provide a spindle motor that drives the cutting tool at high rotational speeds, such as 60,000 rpm. In these motors, particularly because of their rotational velocities, it is critical to obtain precise alignment of the two bearings which support the armature assembly. With conventional manufacturing techniques, there remains a degree of error in bearing alignment which necessitates a protracted period of run-in before the motor is suitable for use. Bearing life also may be cut short by lack of extreme accuracy in alignment.

In order to retain the field winding within the housing of the motor and to provide support for the bearings, the motor housing must be formed in at least two pieces. In the prior art, it has been common to attach the two housing sections together by means of bolts or screws. Each housing section is produced separately from the other, including the formation of bearing support surfaces of the housing. Inherently, this leads to some inaccuracy in the alignment of the bearing support surfaces in the housing. Moreover, when the housing sections are secured together by fasteners, such as bolts or screws, the tensioning of the fasteners introduces unequal stresses into the housing, causing the housing to become distorted, thereby contributing to the misalignment of the bearing support surfaces.

In the prior art, it has been common to provide for the flow of coolant through the motor to remove heat from the bearing areas and prevent their destruction from heat build-up. This has been accomplished by a spiral passage through the motor for the flow of coolant. This type of passage creates a restriction which impedes the flow and therefore is undesirable.

SUMMARY OF THE PRESENT INVENTION

The present invention provides an improved motor adapted for high speed rotation, having significantly improved bearing alignment and greater coolant flow. The motor includes an inner housing assembly made up of two sections, each of which has a cylindrical wall. The inner ends of these walls are recessed so as to form complementary telescoping sections. The two inner housing members are bonded together at the telescoping sections, resulting in a permanent connection without generating stresses in the material of the housing. Distortion is entirely eliminated. The field winding is bonded inside of the two housing sections.

After the two inner housing members are bonded together, the surfaces for the bearing support are jig bored. Because the housing is unitary, both bearing surfaces may be formed while the housing is in a single fixture, resulting in greater accuracy of positioning and alignment. With the complete absence of unequal stresses from the use of fasteners, extreme precision of bearing alignment is possible. This, in turn, gives improved bearing life, quieter operation and greatly reduced run-in time. The motor assembly is easily and economically made on a mass production basis.

The motor also includes an outer housing which fits around the inner housing leaving an annular space forming a passageway for the flow of coolant. This is an unrestricted opening to permit maximum coolant flow. Portions of the coolant passageway extend to the vicinity of the bearing supports, effectively removing heat from the bearing areas. The efficient motor cooling contributes to the long, trouble-free life of the unit.

DESCRIPTION OF THE PREFERRED EMBODIMENT

Figure 1:
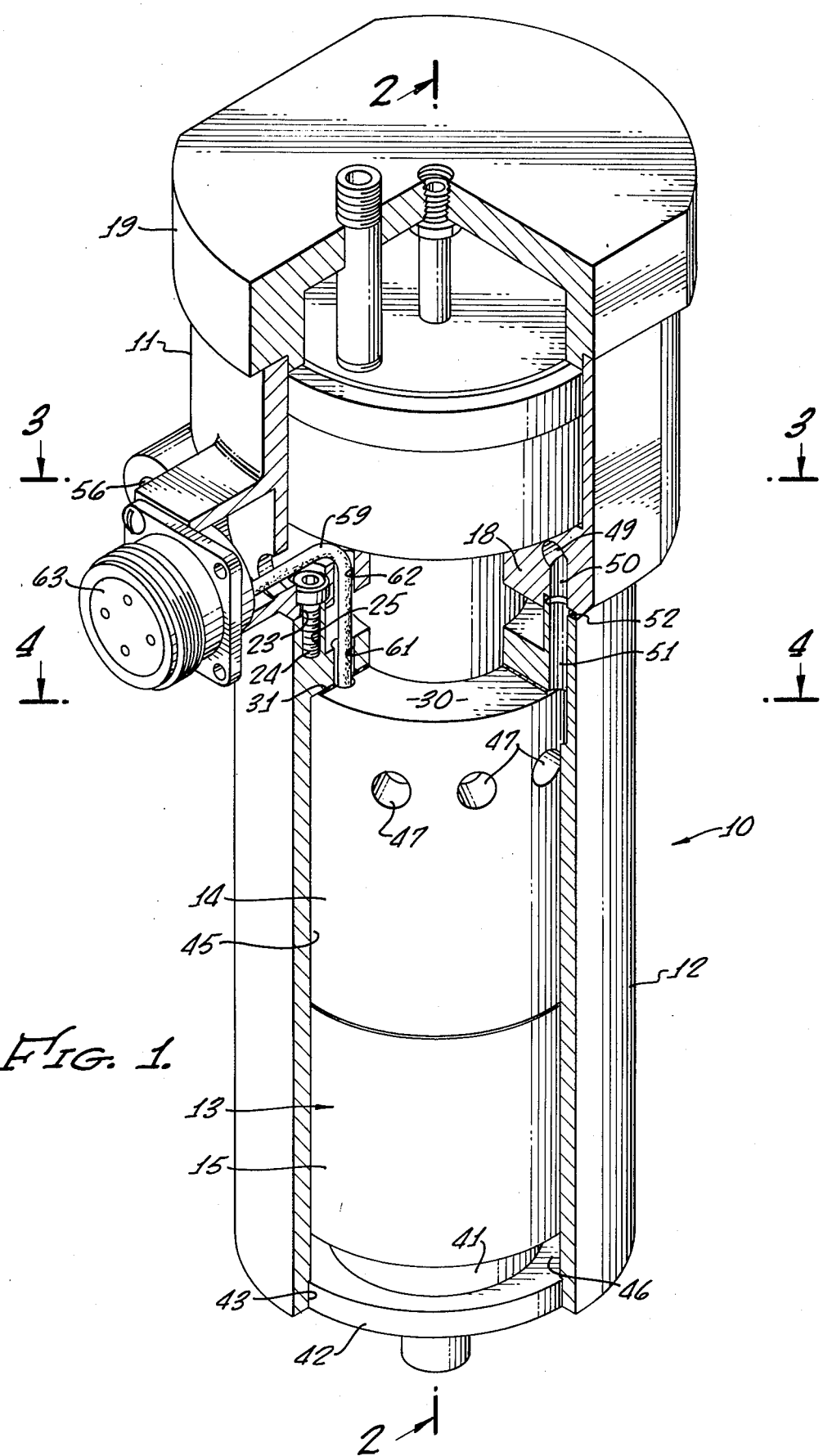
FIG. 1 is a perspective view, partially broken away, of an electric motor constructed in accordance with the present invention.
Figure 2:
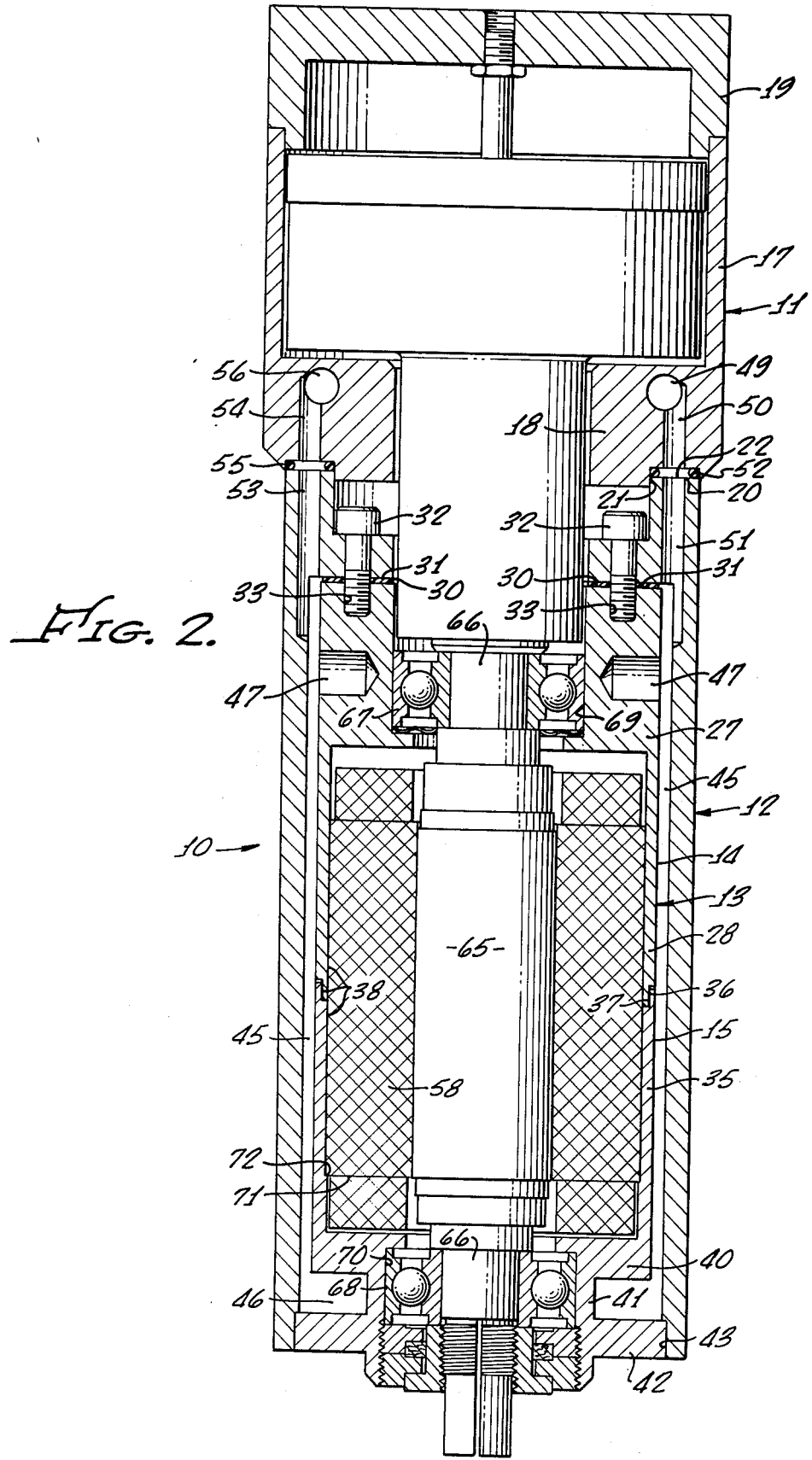
FIG. 2 is a longitudinal sectional view of the motor, taken along line 2—2 of FIG. 1.
Figure 3:
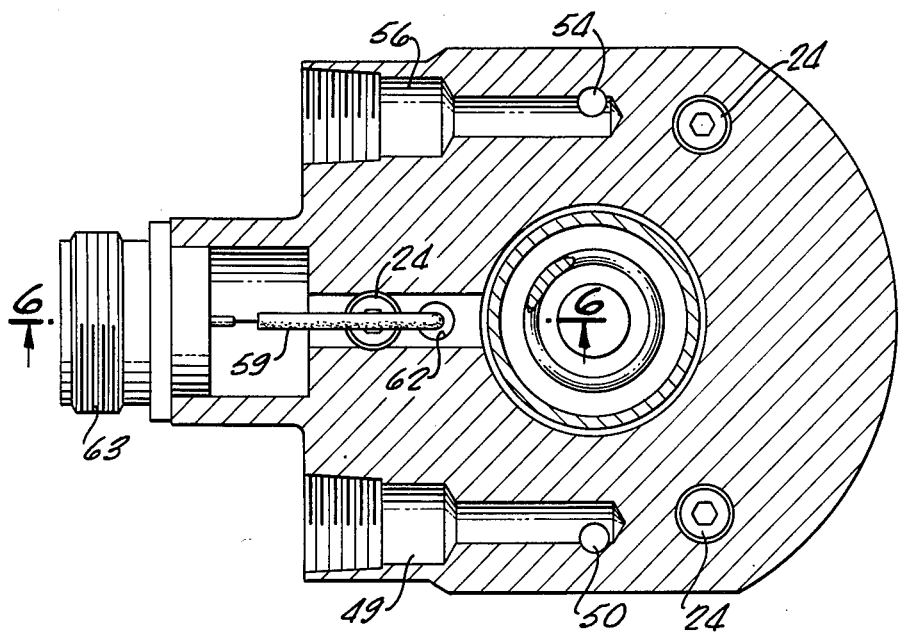
FIG. 3 is a transverse sectional view, taken along line 3—3 of FIG. 1.
Figure 4:
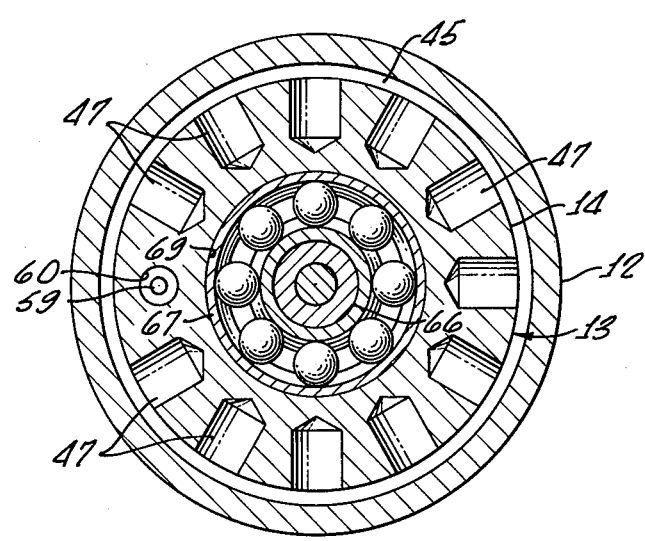
FIG. 4 is a transverse sectional view, taken along line 4—4 of FIG. 1.
Figure 6:
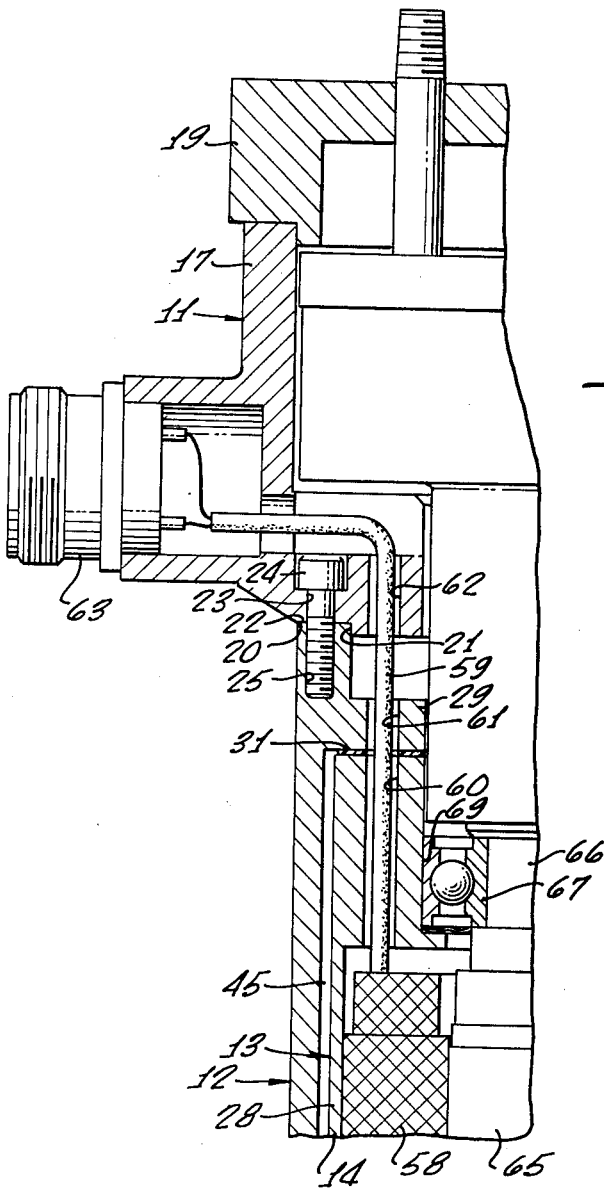
FIG. 6 is a fragmentary sectional view, taken along line 6—6 of FIG. 3.
Figure 5:
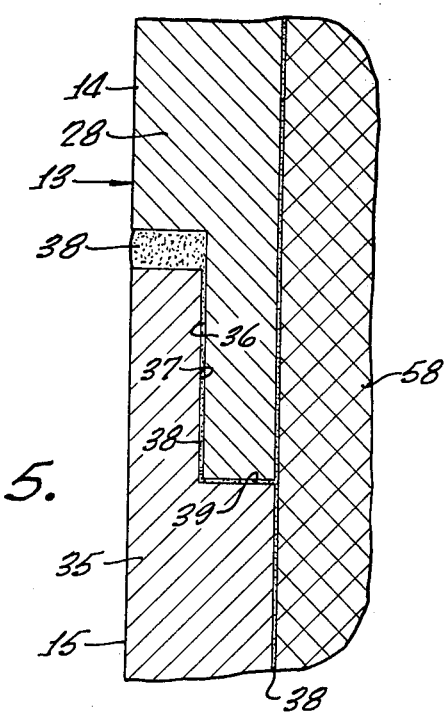
FIG. 5 is an enlarged fragmentary sectional view illustrating the manner in which the inner housing sections are bonded together.

The motor 10 illustrated in the drawing is for driving the drill or router bit of an automatic drilling machine or combined drilling and routing machine. Included in the motor assembly is a means for actuating the collet that holds the cutting tool, but this actuating mechanism forms no part of the present invention and is not illustrated in detail.

The motor assembly includes a cylinder 11 at its upper end which houses components for operating the collet, provides entry for the electrical connections to the motor and provides the inlet and outlet for cooling water, as will be described below. An outer housing 12 connects to the lower end of the cylinder 11. Within the outer housing 12 is an inner housing 13 made up of an upper section 14 and a lower section 15.

The cylinder 11 is a generally cup-shaped member having a circumferential wall 17 extending from a relatively thick base 18. A cap 19 engages the circumferential wall 17 and closes the upper end of the cylinder 11.

The base 18 of the cylinder 11 is stepped on its lower surface so as to provide an annular radial surface 20 adjacent to the outer edge of the base, bounded on the inside by a circumferential shoulder 21. The outer housing 12, which defines a cylindrical sleeve, engages the surfaces 20 and 21 of the cylinder 11 at its upper end portion 22. This accurately positions the outer housing 12 with respect to the cylinder 11, axially aligning these two components of the assembly. Openings 23 through the base 18 of the cylinder 11 are parallel to the axis of the assembly and receive screws 24. Tapped openings 25 in the upper end of the outer housing 12 receive the lower ends of the screws 24, thereby securing the outer housing 12 to the cylinder 11.

The upper section 14 of the inner housing 13 is tubular, having an upper portion 27 with a relatively thick wall and a lower portion 28 of a considerably thinner wall. An inwardly projecting radial flange 29, spaced a short distance below the upper end of the outer housing 12, overlies the upper end surface 30 of the upper section 14 of the inner housing 13. A gasket 31 is interposed between the flange 29 and the upper end surface 30. Screws 32 extend through the flange 30 parallel to the axis of assembly to enter tapped openings 33 in the upper thick-walled portion 27 of the inner housing section 14. The screws 32 secure the upper end of the inner housing 13 to the outer housing 12.

The lower housing section 15 includes an upper portion 35 having a relatively thin wall, comparable to that of the lower section 28 of the upper inner housing portion 14. The wall 28 of the upper housing section 14 is recessed annularly on its exterior at its lower end to provide an outwardly facing circumferential surface 36. A counterbore is provided in the upper end of the thin-walled portion 35 of the lower inner housing section 15 which provides an inwardly facing circumferential surface 37. When the inner housing members 14 and 15 are assembled to form the inner housing assembly 13, the surface 36 closely overlies the surface 37. In other words, the lower end of the upper housing section 14 is telescoped into the upper end of the lower housing section 15, with circumferential surfaces of these two housing sections being in adjacency and serving to precisely position and axially align the two sections of the inner housing 13. An adhesive 38 interposed between the surfaces 36 and 37 bonds the upper housing section 14 to the lower housing section 15 to provide a unitary housing assembly. The radial shoulder 39 at the inner end of the counterbore in the lower housing section 15 limits the axial movement of the end of the upper housing section 14 into the counterbore.

The lower end of the housing section 15 includes a radial wall 40 extending inwardly to a cylindrical portion 41 of reduced diameter. A radial flange 42 projects outwardly from the portion 41 to engage a counter-bored wall 43 of the bottom end of the outer housing 12. This centers the lower portions of the inner and outer housings with respect to each other. An additional quantity of adhesive 38 bonds the flange 42 to the outer housing at the counterbore 43.

The circumferential walls of the outer housing 12 and the inner housing 13 are spaced from each other, thereby providing an open annular passageway 45 for the circulation of cooling water. At the lower end, the water circulates through the annular slot 46 around the reduced diameter portion 41 of the housing element 15, between the wall 40 and the flange 42. At the upper end of the inner housing there are several radial blind openings 47 in the thick-walled portion 27 of the upper inner housing element 14. Cooling water therefore has access to these openings 47 to transmit away heat during operation of the motor.

Cooling water enters the motor through an inlet port 49 in the cylinder 11 which extends laterally to intersect a passageway 50 in the cylinder 11 that extends parallel to the axis of the unit. This, in turn, connects to an opening 51 extending inwardly from the upper end of the outer housing 12 and communicating with the annular passageway 45. An O-ring 52 provides a seal where the opening 50 of the cylinder 11 meets the opening 51 of the outer housing 12.

Outward flow of the cooling water is on the opposite side of the axis of the motor and through passageways similar to the water inlet passageways. Thus, there is an outlet opening 53 in the upper end of the outer housing 12 on the opposite side from the opening 51, leading to the lower end of the cylinder 11 to empty into an opening 54 in the cylinder. An O-ring 55 seals the joint between the cylinder and the housing 12 at the location of the passages 53 and 54. From the passageway 54 the water flows into an outlet port 56 through which it is withdrawn from the unit.

The field winding 58 for the electric motor is carried by the inner housing 13, being bonded by adhesive 38 to the inner wall of both the upper housing section 14 and the lower housing section 15. The field 58 is energized by a conductor 59 which extends from the field through a longitudinal opening 60 in the thick-walled portion 27 of the upper section 14 of the inner housing. From there, the conductor passes through an opening 61 in the flange 29 of the outer housing 12 and an opening 62 in the base 18 of the cylinder 11. The conductor 59 extends laterally through the lower portion of the cylinder 11 to a connector 63 at the exterior of the motor.

Within the field 58 is the armature 65. Support for the armature is provided by a shaft 66 which is rotatable within upper and lower ball bearings 67 and 68, respectively. The ball bearing 67 is within the upper thick-walled portion 27 of the housing element 14 with its outer race supported on the surface of a cylindrical axial opening 69 that extends downwardly into this section of the inner housing. The inner ends of the blind openings 47 are close to the surface 68 so that the cooling water keeps the bearing 67 cool as the armature rotates at high speed during operation of the motor.

At the lower end of the motor assembly, the bearing 68 is supported on a cylindrical surface 70 that extends upwardly into the housing member 15. The slot 46 extends around the outside of the bearing area to conduct coolant to this zone and efficiently cool the lower bearing 68.

In the manufacture of the motor, prior to the assembly of the housing members, the field 58 is positioned in the lower housing section 15 and bonded to the lower housing section along its outer circumferential surface. The shoulder 71 of the field 58 engages an internal shoulder 72 in the housing section 15 which positions the field 58 axially of the lower housing section. This leaves the upper end portion of the field protruding from the section 15. Next, after application of adhesive 38, the upper housing section 14 is slid over the upper end of the field 58 and the surface 36 of the upper housing section is fitted within the surface 37 of the lower housing section 15.

This causes the bonding of the upper housing section 14 to the upper end of the field 58, as well as the bonding of the two inner housing section together at the surfaces 36 and 37.

The bonding of the upper inner housing section 14 to the lower inner housing section 15 and to the field 58 results in a unitary assembly held together without the use of bolts or screws, with the field 58 received between the end walls of the housing assembly 13. This is a permanent attachment achieved without distorting the housing assembly. If fasteners were used, on the other hand, inevitably there would be some unequal stressing of the material which would achieve some degree of distortion of the secured portions of the housing assembly.

The inner housing assembly 13 then is machined to provide the finished openings for receiving the upper and lower bearings 67 and 68. Because the inner housing 13 is unitary and bonded together, it may be jig bored in a single fixture to form the cylindrical surfaces 69 and 70. As a result, very accurate axial and angular alignment of the openings 69 and 70 is accomplished.

This, in turn, assures precise alignment of the bearings 67 and 68. This produces longer life for the motor, quieter operation, and a greatly reduced run-in time for the bearings upon completion of the motor.

To complete the assembly of the housing members, the outer housing 12 is fitted over the inner housing 13 with the adhesive 38 interposed between the counterbored surface 43 of the outer housing 12 and the outer circumferential surface of the flange 42 of the lower inner housing section 15. The screws 32 then are tightened in the openings 33 in the opposite end of the inner housing 13, so that the housing sections are secured together and the outer housing 12 is bonded to the inner housing 13 at the flange 42.

The foregoing detailed description is to be clearly understood as given by way of illustration and example only, the spirit and scope of this invention being limited solely by the appended claims.

I claim:
1. An electric motor comprising
a housing means, said housing means including first and second housing members,
said first and second housing members having circumferential walls, said circumferential walls having end portions telescoped together,
said first and second housing members defining first and second bearing support surfaces, respectively,
said first and second bearing support surfaces being axially aligned,
and adhesive means interposed between said end portions for bonding said circumferential walls together so that said first and second housing members form a unitary structure, there being no fastener means for securing said first and second housing members together so that said first and second housing members are substantially undistorted,
a first bearing carried by said first bearing support surface,
a second bearing carried by said second bearing support surface, said first and second bearings being axially aligned by said first and second bearing support surfaces,
a field in said housing means,
and an armature assembly rotatable in said first and second bearings.
2. A device as recited in claim 1 in which said field is bonded to the interior of said circumferential walls of said first and second housing members.
3. A device as recited in claim 1 in which
one of said end portions defines an annular recess in said circumferential wall thereof, and the other of said end portions defines a counterbore,
said portion defining said annular recess being complementarily received in said counterbore for providing said adjacent end portions telescoped together.
4. A device as recited in claim 2 in which said passage is substantially uniform in dimension and unobstructed throughout the space between said circumferential walls of said first and second housing members and said third housing member.
5. A device as recited in claim 4 in which said passage includes portions extending to positions adjacent said first and second bearings for conducting heat away from said bearings upon circulation of said coolant.
6. A device as recited in claim 4 in which one of said portions of said circumferential wall is provided with an outwardly facing annular recess on one end thereof,
and the other of said portions of said circumferential wall is provided with a counterbore in one end thereof,
said one portion at said annular recess being complementarily received in said counterbore, whereby said ends of said portions define said complementary surfaces telescoped together.
7. An electric motor comprising
a housing means
said housing means having opposite end walls and a circumferential wall interconnecting said end walls,
said housing means being in two integral sections, each of said sections including a portion of said circumferential wall, said portion of said circumferential wall including adjacent ends defining complementary surfaces telescoped together so as to align said portions,
adhesive means between said complementary surfaces for securing said two sections together,
there being no fastener means for securing said two sections together so that said housing means is substantially undistorted,
a field winding within said housing means intermediate said end walls,
adhesive means intermediate said field winding and each of said portions of said circumferential wall for securing said field winding to each of said portions of said circumferential wall,
a first bearing support surface defined by one of said sections,
a second bearing support surface defined by the other of said sections,
said first and second bearing support surfaces being axially aligned,
a first bearing supported by said first bearing support surface,
a second bearing supported by said second bearing support surface, said first and second bearings being axially aligned by said first and second bearing support surfaces,
and an armature assembly rotatably mounted in said first and second bearings.
8. An electric motor comprising:
a housing means,
said housing means having opposite end walls and a circumferential wall interconnecting said end walls,
said housing means being in two integral sections, each of said sections including a portion of said circumferential wall,
said portions of said circumferential wall including adjacent ends defining complementary surfaces telescoped together so as to align said portions,
adhesive means between said complementary surfaces for securing said two sections together,
there being no fastener means for securing said two sections together so that said housing means is substantially undistorted,
a field winding within said housing means intermediate said end walls,
adhesive means intermediate said field winding and each of said portions of said circumferential wall for securing said field winding to each of said portions of said circumferential wall, a first bearing support surface defined by one of said sections, a second bearing support surface defined by the other of said sections, said first and second bearing support surfaces being axially aligned, a first bearing supported by said first bearing support surface, a second bearing supported by said second bearing support surface, said first and second bearings being axially aligned by said first and second bearing support surfaces, an armature assembly rotatably mounted in said first and second bearings, and a second housing means receiving said first-mentioned housing means, said second housing means having a circumferential wall spaced outwardly from said circumferential wall of said first-mentioned housing means so as to define a coolant passage therebetween, said passage including portions extending to positions of adjacency with said first and second bearings, inlet means for introducing coolant into said passage, and outlet means for removing coolant from said passage.

9. A device as recited in claim 8 in which said passage between said circumferential walls in substantially unobstructed.

10. A device as recited in claim 8 in which said adhesive means secures portions of said first mentioned housing means to said second housing means.

11. A device as recited in claim 10 in which one of said sections of said first mentioned housing means includes a flange, said second housing means having a surface complementarily receiving said flange, said adhesive means for securing portions of said first mentioned housing means to said second housing means including a quantity of adhesive interposed between said flange and said surface of said second housing means.

12. A device as recited in claim 11 in which said flange defines the boundary of a portion of said coolant passage extending inwardly to a position adjacent one of said bearing support surfaces for removing heat generated by the one of said bearings supported thereby.

13. A device as recited in claim 12 including in addition fastener means for securing other portions of said first mentioned housing means to said second housing means.

14. An electric motor comprising a housing means, said housing means including first and second housing members, said first and second housing members having circumferential walls, said circumferential walls having end portions telescoped together, said first and second housing members defining first and second bearing support surfaces, respectively, said first and second bearing support surfaces being axially aligned, and adhesive means interposed between said end portions for bonding said circumferential walls together so that said first and second housing members form a unitary structure, there being no fastener means for securing said first and second housing members together so that said first and second housing members are substantially undistorted, a first bearing carried by said first bearing support surface, a second bearing carried by said second bearing support surface, said first and second bearings being axially aligned by said first and second bearing support surfaces, a field in said housing means, an armature assembly rotatable in said first and second bearings, a third housing member having a circumferential wall, said first and second housing members being received in said third housing member, with said circumferential walls of said first and second housing members being spaced from said circumferential wall of said third housing member for providing a passage around said first and second housing members, inlet means for introducing coolant into said passage, and outlet means for removing coolant from said passage.

* * * * *